(12) United States Patent
Kaneko et al.

(10) Patent No.: US 8,072,867 B2
(45) Date of Patent: Dec. 6, 2011

(54) OPTICAL PICKUP

(75) Inventors: Takahiro Kaneko, Yokohama (JP);
Takayoshi Hiraga, Yokohama (JP)

(73) Assignee: Victor Company of Japan, Ltd., Kanagawa-Ken (JP)

( * ) Notice: Subject to any disclaimer, the term of this patent is extended or adjusted under 35 U.S.C. 154(b) by 38 days.

(21) Appl. No.: 12/799,261

(22) Filed: Apr. 21, 2010

(65) Prior Publication Data
US 2010/0271923 A1    Oct. 28, 2010

(30) Foreign Application Priority Data
Apr. 23, 2009   (JP) .................................. 2009-104877

(51) Int. Cl.
*G11B 7/00* (2006.01)

(52) U.S. Cl. ............ 369/112.05; 369/44.23; 369/112.01; 369/112.03; 369/112.1; 369/112.15; 359/15

(58) Field of Classification Search ............... 369/44.23, 369/112.01, 112.03, 112.05, 112.1, 112.15; 359/15
See application file for complete search history.

(56) References Cited

FOREIGN PATENT DOCUMENTS
JP    2007-164957    6/2007

*Primary Examiner* — Wayne Young
*Assistant Examiner* — Brenda Bernardi
(74) *Attorney, Agent, or Firm* — Renner, Kenner, Greive, Bobak, Taylor & Weber (57) ABSTRACT

An optical-pickup hologram element has six regions on an x-y plane, divided as follows: the first region with a first line (an x-axis) and a second line that connects points (−xa, 0) and (−xb, yb); the second region with the first and second lines and a third line connecting points (xa, 0) and (xb, yb); the third region with the first and third lines; the fourth region with the first line and a fourth line connecting the point (xa, 0) and a point (xb, −yb); the fifth region with the first and fourth lines and a fifth line connecting the point (−xa, 0) and a point (−xb, −yb); and the sixth region with the first and fifth lines (xa<xb and −xb<−xa). The second and fifth, and the other regions are given astigmatism at different angles to the second line.

6 Claims, 9 Drawing Sheets

OPTICAL PICKUP

CROSS-REFERENCE TO RELATED APPLICATIONS

This application is based on and claims the benefit of priority from the prior Japanese Patent Application No. 2009-104877 filed on Apr. 23, 2009, the entire contents of which is incorporated herein by reference.

BACKGROUND OF THE INVENTION

The present invention relates to an optical pickup for recording/reproducing information on/from an optical disc, especially, provided with a hologram element.

A known optical pickup is provided with a hologram element in accordance with an astigmatism method, aiming for both of focus error detection and compactness as well as high reliability.

Another known optical pickup is provided with two laser sources with different wavelengths for two types of optical disc with different recording densities, such as, CD and DVD. This type of optical disc is generally provided with a laser source dedicated for DVD that is an optical disc of high recording density used at shorter wavelength than CD and another laser source dedicated for CD, the former laser source being located on the optical axis of an objective lens, the latter being located in the vicinity of the former.

A still another known optical pickup is used for recording/reproducing information on/from an optical disc with two information recording layers, such as dual-layered DVD.

Figure 1:
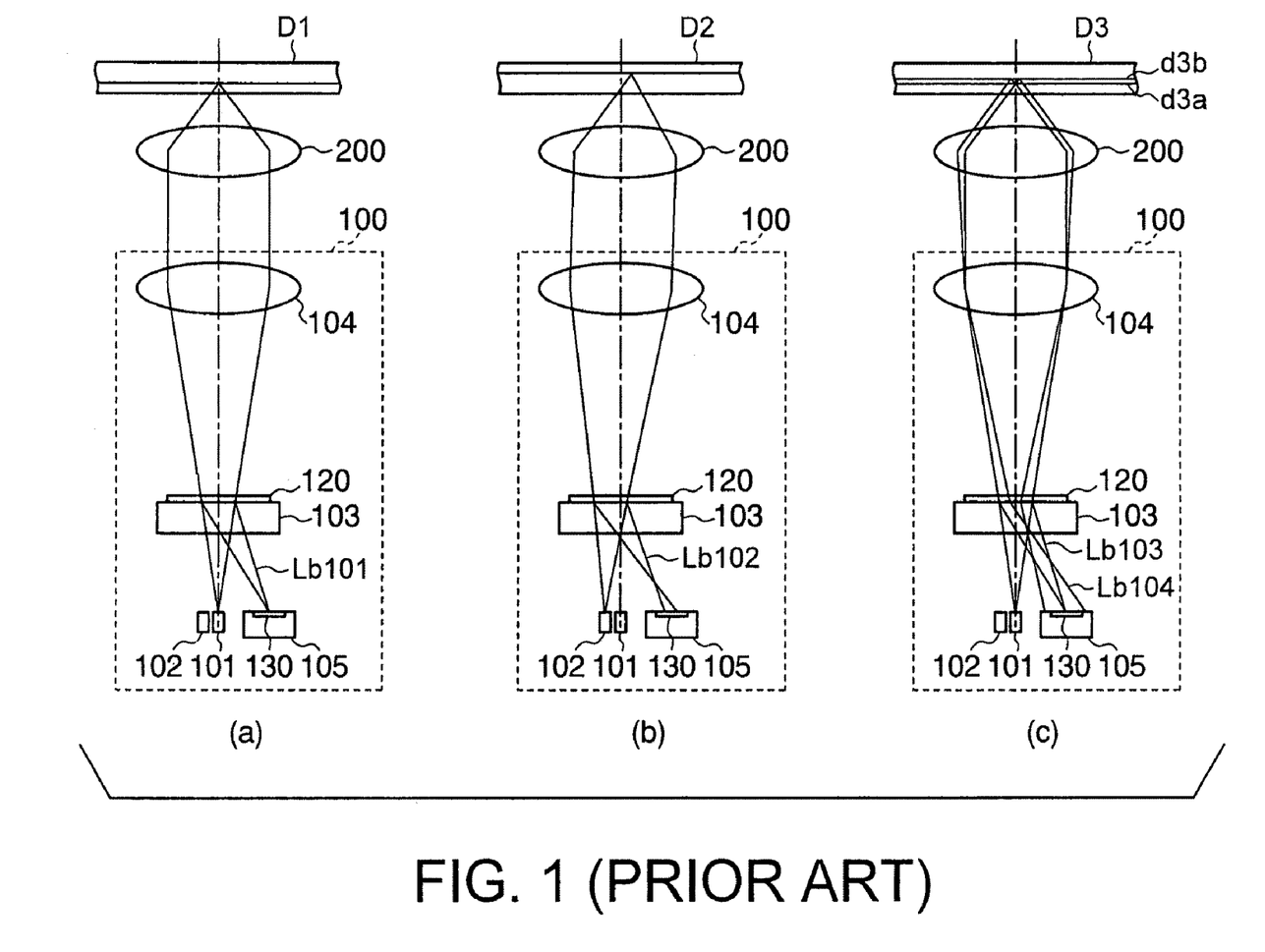
FIG. 1 shows schematic illustration of a positional relationship between a known optical pickup, and an objective lens and an optical disc.
Figure 2:
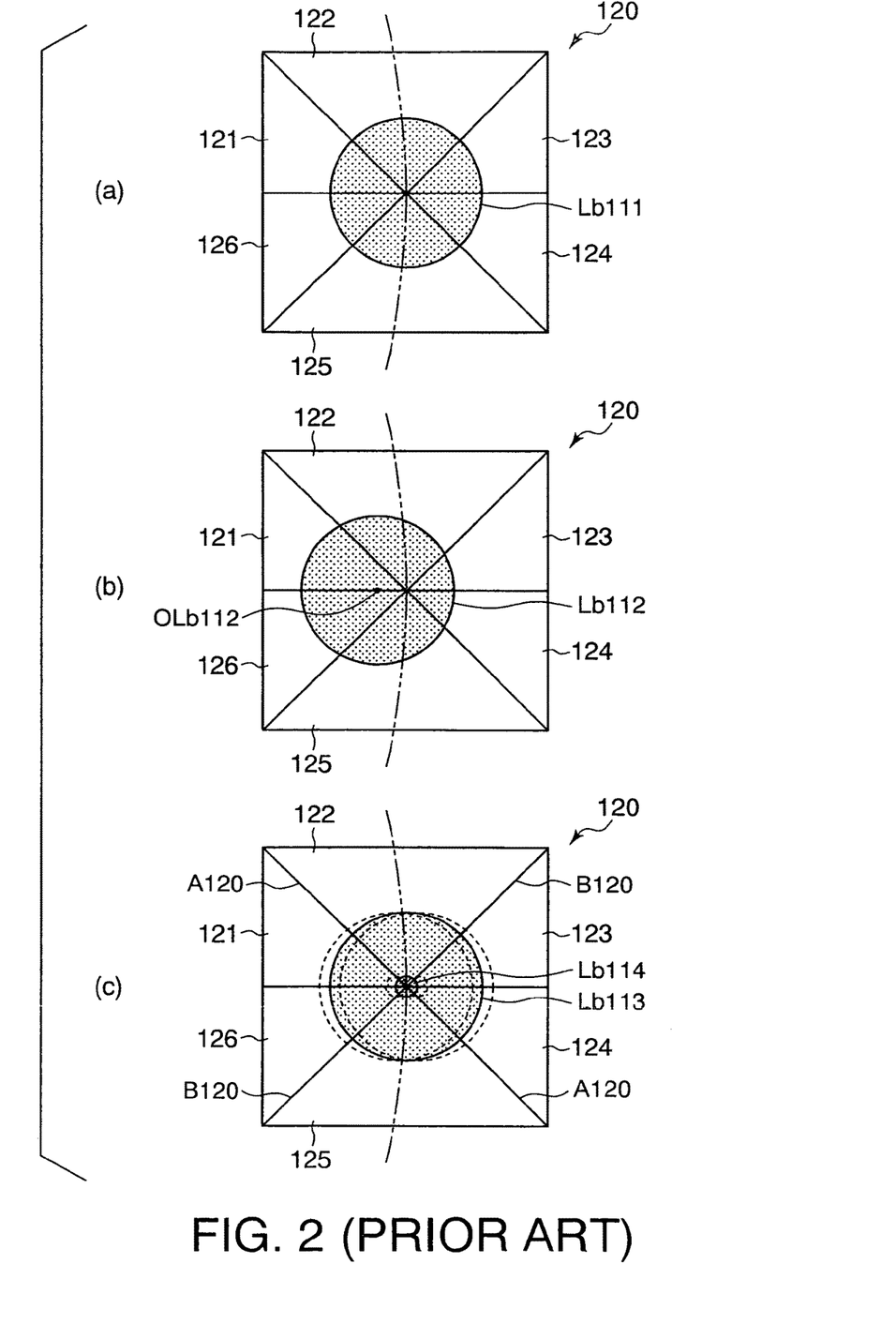
FIG. 2 shows schematic illustration of a hologram section in the known optical pickup.
Figure 3:
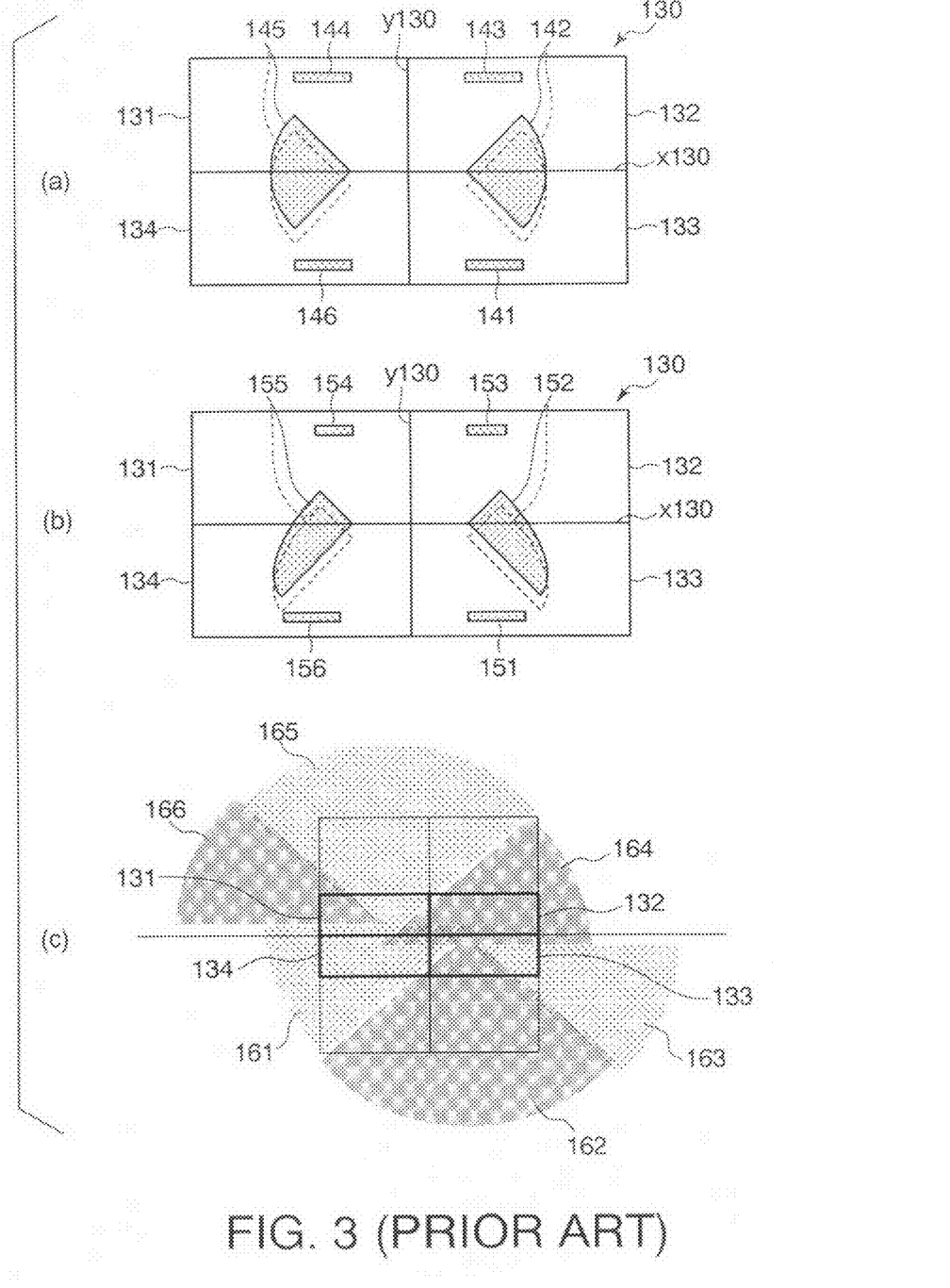
FIG. 3 shows schematic illustration of a light receiving section in the known optical pickup.

Discussed below with reference to FIGS. 1 to 3 are problems that occur: when a known optical pickup having a hologram element in accordance with the astigmatism method is provided with two types of laser source; and when such a known optical pickup is used for reproduction of an optical disc having two information recording layers.

FIG. 1 shows schematic illustration of a positional relationship between a known optical pickup, and an objective lens and an optical disc. In detail, (a) and (b) of FIG. 1 are sectional views illustrating reproduction of a DVD and a CD, respectively. A sectional view in (c) of FIG. 1 illustrates reproduction of a dual-layered DVD, in detail, from the information recording layer closer to laser sources.

FIG. 2 shows schematic illustration of a hologram section in the known optical pickup. In detail, (a) and (b) of FIG. 2 are plan views illustrating a beam on a hologram section, returned from a DVD and a CD, respectively, in reproduction. A plan view in (c) of FIG. 2 illustrates a beam on a hologram section, returned from a dual-layered DVD, in detail, from the information recording layer closer to laser sources.

FIG. 3 shows schematic illustration of a light receiving section in the known optical pickup. In detail, (a) and (b) of FIG. 3 are plan views illustrating a beam on a light receiving section, returned from a DVD and a CD, respectively, in reproduction, and after diffracted when passing through a hologram section. A plan view in (c) FIG. 3 illustrates a beam on a light receiving section, returned from a dual-layered DVD, in detail, from the information recording layer closer to laser sources, and after diffracted when passing through a hologram section.

As shown in FIG. 1, a known optical pickup 100 is provided with a laser source 101 for DVD use, a laser source 102 for CD use, a hologram element 103 having a hologram section 120, a collimator lens 104, and a photo receptor 105 having a light receiving section 130.

The laser source 101 for DVD use is located on the optical axis of an objective lens 200. The laser source 102 for CD use is located in the vicinity of the laser source 101 for DVD use. The distance between the hot spots of the laser sources 101 and 102 is 100 μm or more depending on the structure of the two laser sources.

As shown in FIG. 2, the hologram section 120 has six hologram zones 121 to 126. Chain double dashed lines in (a), (b) and (c) of FIG. 2 indicate tracks of optical discs D1, D2 and D3, respectively.

As shown in FIG. 3, the light receiving section 130 has four light receiving zones 131 to 134.

Discussed below first is a problem related to the two types of laser source used in the known optical pickup 100.

In reproduction of a DVD, an optical disc D1 in (a) of FIG. 1, as shown in (a) of FIG. 2, a beam spot Lb111 of a return beam Lb101 from the optical disc D1 is located in the center region of the hologram section 120. This is because the laser source 101 for DVD use is located on the optical axis of the objective lens 200, as shown in (a) of FIG. 1.

The return beam Lb101 is diffracted when passing through each of the six hologram sections 121 to 126. The diffracted return beam Lb101 then reaches the photoreceptor 130, as shown in (a) of FIG. 1.

Beam areas 141 to 146 on the photoreceptor 130, shown in (a) of FIG. 3, are particular regions on which the return beam Lb101 reaches after diffracted when passing through the hologram sections 121 to 126 in (a) of FIG. 2.

The beam areas 141 to 146, shown in (a) of FIG. 3, correspond to the hologram sections 121 to 126, shown in (a) of FIG. 2, respectively.

In reproduction of a CD, an optical disc D2 in (b) of FIG. 1, as shown in (b) of FIG. 2, a beam spot Lb112 of a return beam Lb102 from the optical disc D2 is shifted from the center of the hologram section 120. This is because the laser source 102 for CD use is shifted from the optical axis of the objective lens 200, as shown in (b) of FIG. 2. The center OLb112 of the beam spot Lb112 is located in a zone different from the hologram zones 122 and 125.

The return beam Lb102 is diffracted when passing through each of the six hologram sections 121 to 126. The diffracted return beam Lb102 then reaches the photoreceptor 130, as shown in (b) of FIG. 1.

Beam areas 151 to 156 on the photoreceptor 130, shown in (b) of FIG. 3, are particular regions on which the return beam Lb 102 reaches after diffracted when passing through the hologram sections 121 to 126 in (b) of FIG. 2.

The beam areas 151 to 156, shown in (b) of FIG. 3, correspond to the hologram sections 121 to 126, shown in (b) of FIG. 2, respectively.

As shown in (a) and (b) of FIG. 3, the beam areas 155 and 152 in CD-reproduction are smaller than the beam areas 145 and 142 in DVD-reproduction, in the light receiving zones 131 and 132. The size of the beam areas corresponds to the amount of light of the beam spot Lb111 in (a) of FIG. 2 and of the beam spot Lb112 in (b) of FIG. 2, on the light receiving zones 131 and 132. Thus, in (b) of FIG. 3, the light receiving zones 131 and 132 receive a smaller amount of light due to the smaller beam areas 155 and 152, resulting in that the photo receptor 105 having these light receiving zones 131 and 132 exhibits lower focus-servo error detection sensitivity in CD-reproduction.

The locations of beam areas on the light receiving section 130 depend on the positional accuracy of optical components in optical pickup assembly.

Broken lines in (a) of FIG. 3 indicate shifted beam areas 145 and 142, in DVD-reproduction, due to inaccurate locations of optical components in optical pickup assembly. Likewise, broken lines in (b) of FIG. 3 indicate shifted beam areas 155 and 152, in CD-reproduction, due to inaccurate locations of optical components in optical pickup assembly.

As shown in (a) of FIG. 3, the shifted beam areas 145 and 142 indicated by the broken lines have a shorter length of superposition with a split line x130 of the light receiving section 130 than the beam areas 145 and 142 (indicated by solid lines) with no shifting. This results in lower focus-servo error detection sensitivity of the photo receptor 105 in DVD-reproduction, for the same reason as discussed above.

Moreover, As shown in (b) of FIG. 3, the shifted beam areas 155 and 152 indicated by the broken lines have a shorter length of superposition with the split line x130 of the light receiving section 130 than the beam areas 155 and 152 (indicated by solid lines) with no shifting, which is much shorter than the shifted beam areas 145 and 142 in (a) of FIG. 3. This results in further lower focus-servo error detection sensitivity of the photo receptor 105 in CD-reproduction, for the same reason as discussed above.

Such lower focus-servo error detection sensitivity could cause delay in tracking of a fluctuating optical disc by the objective lens 104 in recording/reproduction in FIG. 1, which causes a lot of jitters in recorded/reproduced signals or tracking errors.

Discussed next is a problem concerning reproduction of a dual-layered optical disc, such as, a dual-layered DVD, in the known optical pickup 100.

As shown in (c) of FIG. 1, an optical disc D3, such as a dual-layered DVD, has two information recording layers d3a and d3b.

In reproduction of the information recording layer d3a of the optical disc D3, closer to the optical pickup 100, a beam spot Lb113 of a return beam Lb103 from the information recording layer d3a is located in the center region of the hologram section 120, as shown in (c) of FIG. 2. The center region of the hologram section 120 is a zone with astigmatism applied for focus error detection.

During the reproduction of the information recording layer d3a of the optical disc D3, a return beam Lb104 from the information recording layer d3b not undergoing reproduction also reaches the hologram section 120. The return beam Lb104 is an unwanted beam but forms a beam spot Lb114, as indicated by a small solid-line circle in (c) of FIG. 2.

The unwanted return beam Lb104 is diffracted when passing through each of the six hologram sections 121 to 126. The diffracted return beam Lb104 then reaches the photoreceptor 130, as shown in (c) of FIG. 1.

The unwanted return beam Lb104 reaches beam areas 161 to 166, shown in (c) of FIG. 3, after undergoing diffraction by each of the six hologram sections 121 to 126. The beam areas 161 to 166 are the regions on the photoreceptor 130 and the neighboring regions.

The beam areas 161 to 166, shown in (c) of FIG. 3, correspond to the hologram sections 121 to 126, shown in (c) of FIG. 2, respectively.

Tracking, while the return beam Lb103 and the unwanted return beam Lb104 are reaching the hologram regions 121 to 126, causes the beam spot Lb114 of the unwanted beam Lb104 being shifted left and right while crossing split lines A120 and B120. This is indicated by a small broken-line arcs that surround the small solid-line circle (that indicates the beam spot Lb114) in (c) of FIG. 2.

The shift of the beam spot Lb114 of the unwanted return beam Lb104 discussed above results in out-of-focus and the distribution of beam areas 161 to 166, as shown in (c) of FIG. 3.

It is understood from (c) of FIG. 3 that the sum of the beam areas 161 to 166, that is the sum of the amount of light on the beam areas 161 to 166, is different among the light receiving zones 131 to 134. This means that the amount of light of the unwanted return beam Lb104 is different among the light receiving zones 131 to 134, which further means that the influence of the unwanted return beam Lb104 on the light sensitivity of the light receiving zones 131 to 134 is different among the light receiving zones. This results in noises being added to a focus-error detection signal in the photo receptor 105, which causes out-of-focus recording/reproduction with a lot of jitters in recorded/reproduced signals.

SUMMARY OF THE INVENTION

A purpose of the present invention is to provide an optical pickup that exhibits constant recording/reproduction performance at high focus sensitivity, with few jitters to focus-error detection signals, irrespective of the positional accuracy of optical components in optical pickup assembly.

The present invention provides an optical pickup comprising: a laser source for emitting a laser beam to an optical disc; a hologram element provided on an optical axis of the laser beam and having a hologram section provided on a specific area of the hologram element, the hologram section diffracting a return beam reflected by the optical disc; and a photo receptor for receiving the return beam diffracted by the hologram element, wherein the specific area of the hologram element has an x-y plane having a center coordinate point (0, 0), an x-axis that is a first line passing the center coordinate point (0, 0), and a y-axis that is a second line passing the center coordinate point (0, 0) and crossing the first line, and the specific area has a first hologram region, a second hologram region, a third hologram region, a fourth hologram region, a fifth hologram region, and a sixth hologram region on the x-y plane, in which the first hologram region is divided from the second to sixth hologram regions by a first split line that is the first line and a second split line that connects coordinate points (−xa, 0) and (−xb, yb) on the x-y plane, the second hologram region is divided from the first, third, fourth, fifth, and sixth hologram regions by the first and second split lines and a third split line that connects coordinate points (xa, 0) and (xb, yb) on the x-y plane, the third hologram region is divided from the first, second, fourth, fifth, and sixth hologram regions by the first and third split lines on the x-y plane, the fourth hologram region is divided from the first, second, third, fifth, and sixth hologram regions by the first split line and a fourth split line that connects the coordinate point (xa, 0) and a coordinate point (xb, −yb) on the x-y plane, the fifth hologram region is divided from the first, second, third, fourth, and sixth hologram regions by the first and fourth split lines and a fifth split line that connects the coordinate point (−xa, 0) and a coordinate point (−xb, −yb) on the x-y plane, and the sixth hologram region is divided from the first, second, third, fourth, and fifth hologram regions by the first and fifth split lines on the x-y plane, in which xa and xb, and −xa and −xb satisfy relations xa<xb and −xb<−xa, respectively, and the second and fifth hologram regions are applied with astigmatism at a first specific angle to the second line and the first, third, fourth, and sixth hologram regions are applied with astigmatism at a second specific angle different from the first specific angle to the second line.

DETAILED DESCRIPTION OF PREFERRED EMBODIMENT

A preferred embodiment and modification of an optical pickup according to the present invention will be described with reference to FIGS. 4 to 9.

Figure 4:
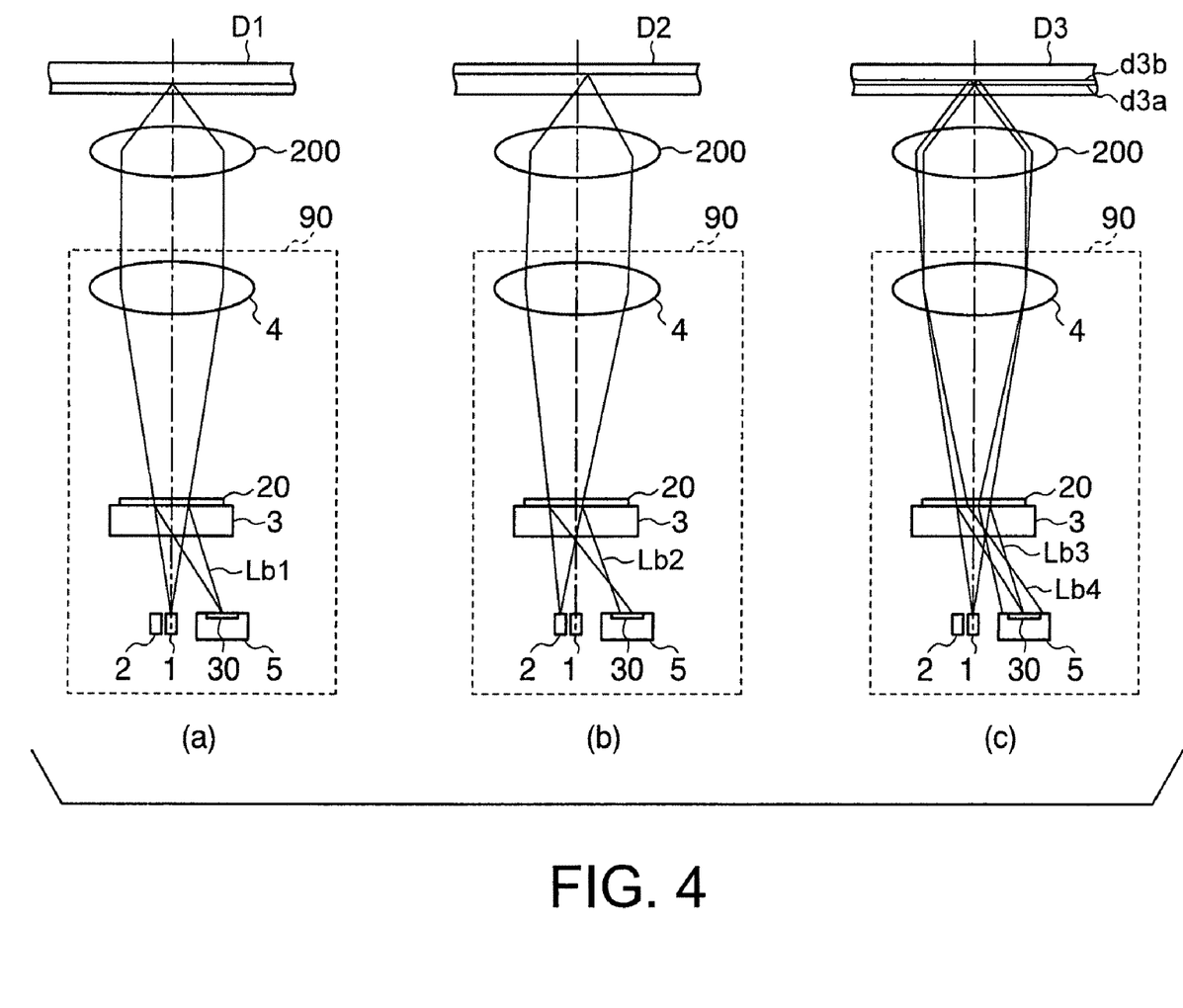
FIG. 4 shows schematic illustration of a positional relationship between an optical pickup, an embodiment according to the present invention, and an objective lens and an optical disc.

FIG. 4 shows schematic illustration of a positional relationship between an optical pickup, an embodiment according to the present invention, and an objective lens and an optical disc. In detail, (a), (b) and (c) of FIG. 4 are sectional views illustrating reproduction of a DVD, a CD, and, a dual-layered DVD, respectively, corresponding to (a), (b) and (c) of FIG. 1, respectively.

Figure 5:
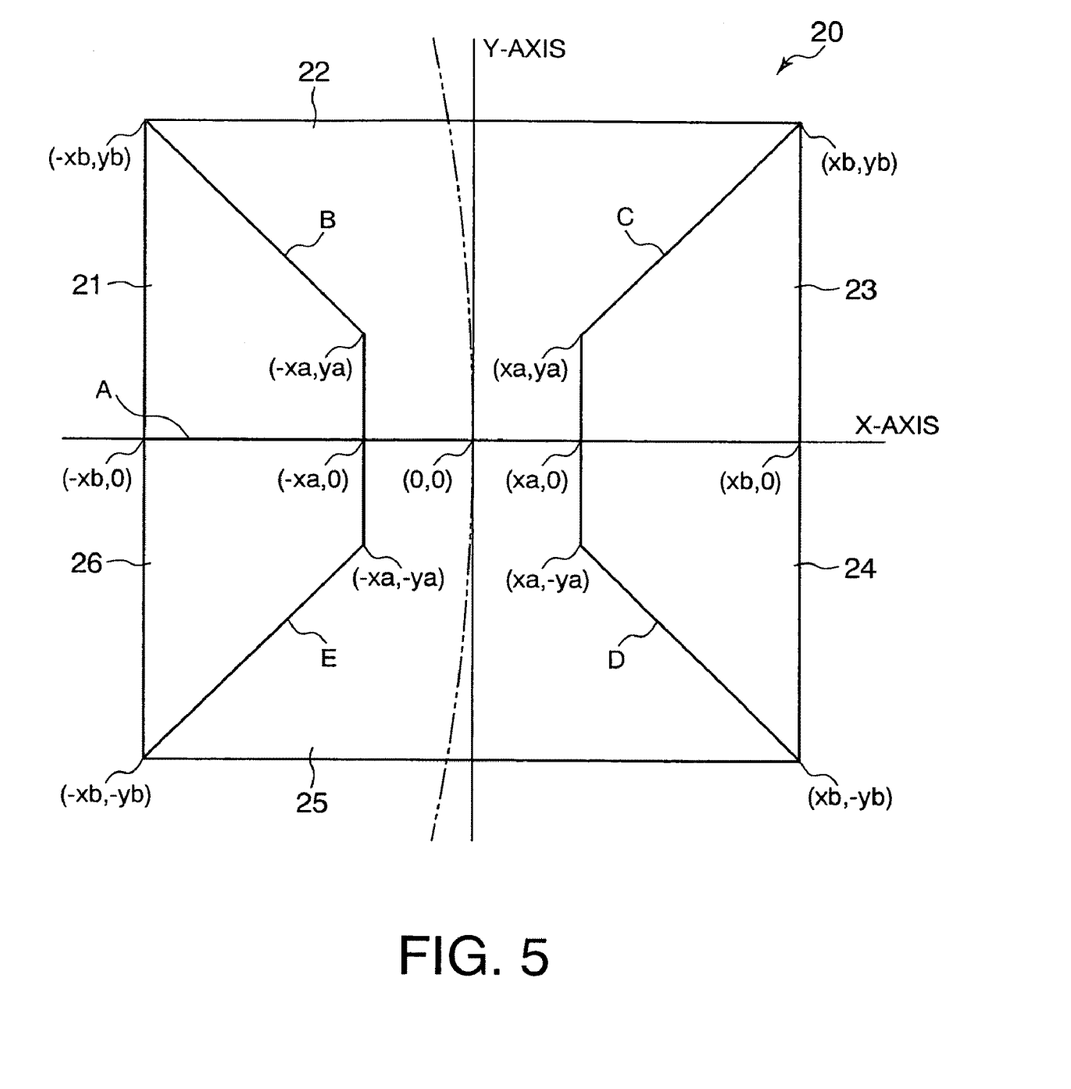
FIG. 5 is a plan view of a hologram section of the optical pickup, the embodiment according to the present invention.

FIG. 5 is a plan view of a hologram section of the optical pickup, the embodiment according to the present invention.

Figure 6:
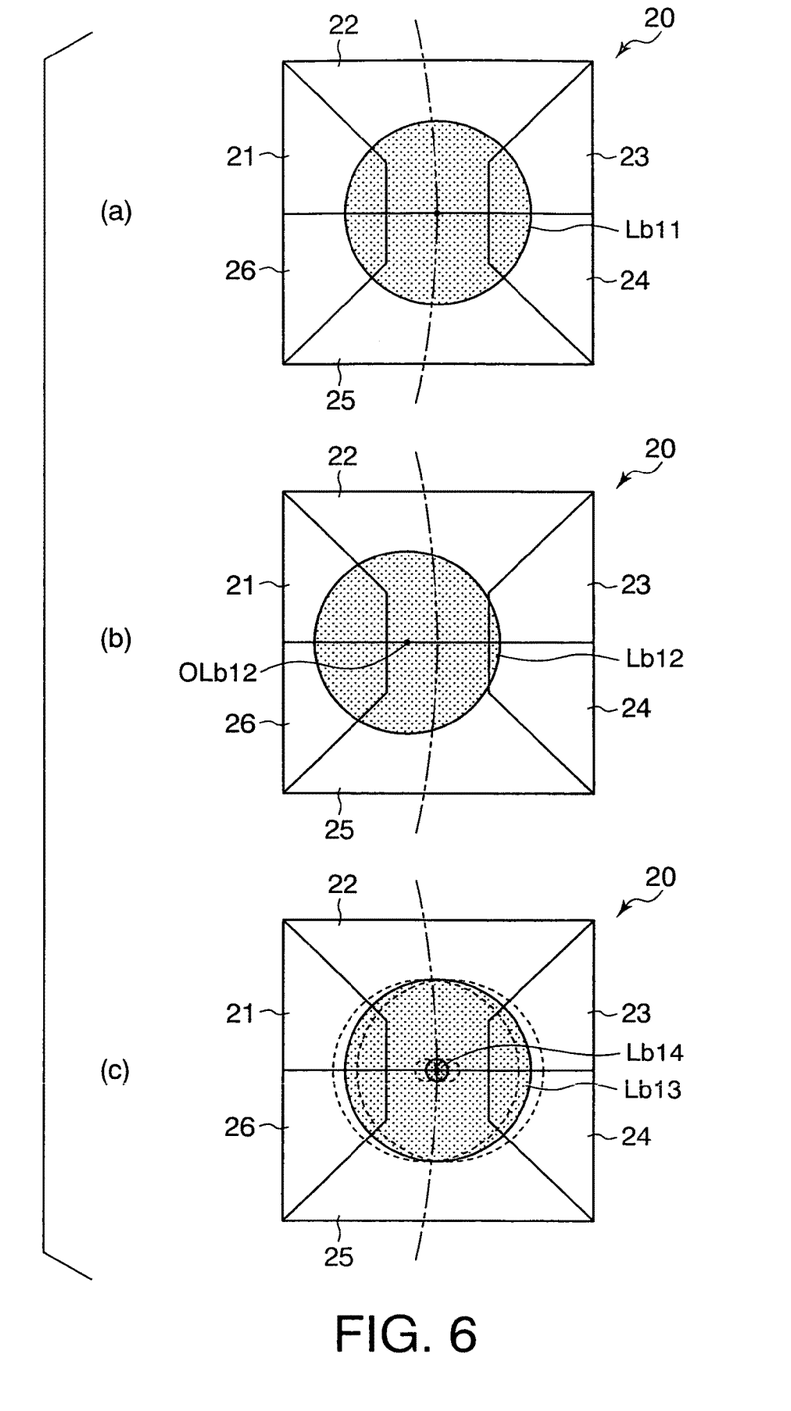
FIG. 6 shows schematic illustration of a hologram section in the optical pickup, the embodiment according to the present invention.

FIG. 6 shows schematic illustration of a hologram section in the optical pickup, the embodiment according to the present invention. In detail, (a), (b), and (c) of FIG. 6 are plan views illustrating a beam on the hologram section, returned from a DVD, a CD, and a dual-layered DVD, respectively, in reproduction, corresponding to (a), (b) and (c) of FIG. 2, respectively.

Figure 7:
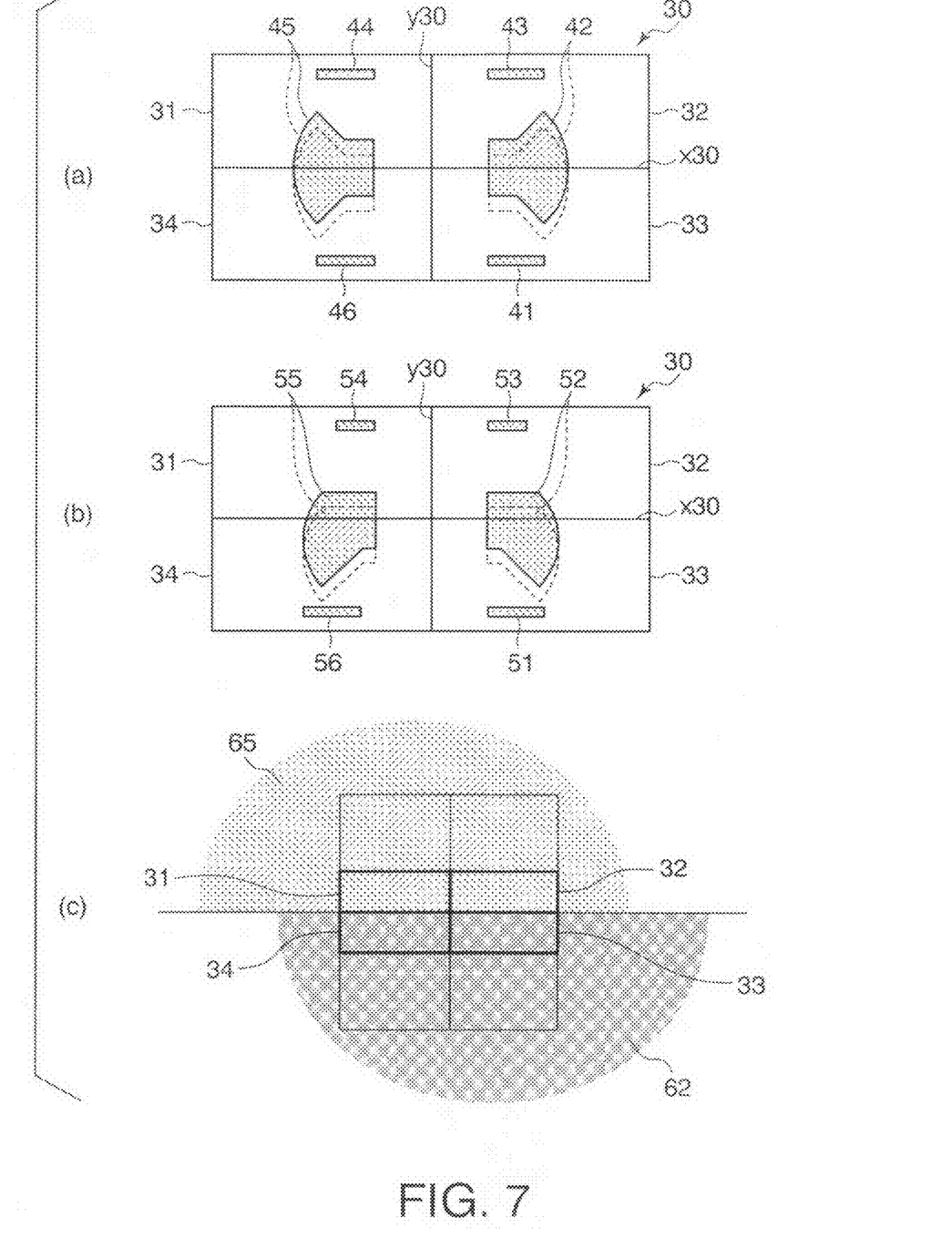
FIG. 7 shows schematic illustration of a light receiving section in the optical pickup, the embodiment according to the present invention.

FIG. 7 shows schematic illustration of a light receiving section in the optical pickup, the embodiment according to the present invention. In detail, (a), (b), and (c) of FIG. 7 are plan views illustrating a beam on a light receiving section, returned from a DVD, a CD, and a dual-layered DVD, respectively, in reproduction, and after diffracted when passing through a hologram section, corresponding to (a), (b) and (c) of FIG. 3, respectively.

As shown in FIG. 4, an optical pickup 90, schematically illustrated and surrounded by broken lines, is provided with laser sources 1 and 2 with different wavelengths, a hologram element 3 having a hologram section 20, a collimator lens 4, and a photo receptor 5 having a light receiving section 30.

Discs shown in (a), (b), and (c) of FIG. 4 are: an optical disc D1, such as a DVD, having a particular information recording density; an optical disc D2, such as a CD, having a lower information recording density than the optical disc D1; and an optical disc D3 having two information recording layers, such as a dual-layered DVD, respectively.

The laser source 1 having a particular wavelength, for example for DVD use, is located on the optical axis of the objective lens 200. The laser source 2 having a wavelength shorter than that of the laser source 1, for example for CD use, is located in the vicinity of the laser source 1 as being apart from the optical axis of an objective lens 200. The distance between the hot spots of the laser sources 1 and 2 is 100 µm or more depending on the structure of the two laser sources.

In the embodiment, the optical pickup 90 has linear magnification of 6 for its built-in optical components, with a distance of 2.6 mm from the hot spot of the laser source 1 to the center of the hologram section 20, and a distance of 0.11 mm between the hot spots of the laser sources 1 and 2.

Described next in detail with reference to FIG. 5 is the hologram section 20 of the hologram element 3 in the embodiment.

As illustrated in FIG. 5, the hologram section 20 has a plurality of regions surrounded by solid lines that connect four coordinate points (−xb, yb), (xb, yb), (xb, −yb), and (−xb, −yb) on the coordinate x-y. Chain double dashed lines in FIG. 5 indicate a track of the optical disc D1, D2 or D3. The y-axis corresponds to a tangent of the track of the optical disc D1, D2 or D3 at a center coordinate point (0, 0).

The hologram section 20 has six hologram regions 21 to 26.

The hologram region 21 is divided from the other hologram regions by: a split line A (corresponding to the x-axis) that passes the center coordinate point (0, 0) and crosses the y-axis; and a split line B that passes a coordinate point (−xa, ya) and connects a coordinate point (−xa, 0) and the coordinate point (−xb, yb).

The hologram region 22 is divided from the other hologram regions by the split lines A and B, and also a split line C that passes a coordinate point (xa, ya) and connects a coordinate point (xa, 0) and the coordinate point (xb, yb).

The hologram region 23 is divided from the other hologram regions by the split lines A and C.

The hologram region 24 is divided from the other hologram regions by the split line A and a split line D that passes a coordinate point (xa, −ya) and connects the coordinate points (xa, 0) and (xb, −yb).

The hologram region 25 is divided from the other hologram regions by the split lines A and D, and also a split line E that passes a coordinate point (−xa, −ya) and connects a coordinate point (−xa, 0) and the coordinate point (−xb, −yb).

The hologram region 26 is divided from the other hologram regions by the split lines A and E.

In the coordinate points described above, xa and xb, ya and yb, −xa and −xb, and −ya and −yb satisfy the relations xa<xb, ya<yb, −xb<−xa, and −yb<−ya, respectively.

Moreover, the following are defined in the embodiment: xa=0.15 mm, Xb=0.5 mm, ya=0.15 mm, yb=0.5 mm, −xa=−0.15 mm, −xb=−0.5 mm, −ya=−0.15 mm, and −yb=−0.5 mm.

The hologram regions 22 and 25 are applied with astigmatism at an angle of about 45 degrees to the tangent (y-axis) of the track of the optical disc D1, D2 or D3 at the center coordinate points (0, 0). In contrast, the hologram regions 21, 23, 24, and 26 are applied with astigmatism at an angle of about 90 degrees to the tangent (y-axis) of the track of the optical disc D1, D2 or D3 at the center coordinate points (0, 0).

The hologram regions 21 to 26 diffract each of the return beams Lb1 to Lb3 from the optical discs D1, D2 and D3, respectively, in a direction that meets the tangent (y-axis) almost at right angles.

Described next with reference to FIGS. 6 and 7 is reproduction of the optical discs D1 (for example, a DVD), D2 (for example, a CD), and D3 (for example, a dual-layered DVD), as shown in (a), (b), and (c) of FIG. 4, respectively.

Illustrations of (a), (b), and (c) of FIG. 4 correspond to those of (a), (b), and (c) of FIG. 1, respectively. Illustrations of (a), (b), and (c) of FIGS. 6 and 7 correspond to those of (a), (b), and (c) of FIGS. 2 and 3, respectively.

Described first is the light receiving section 30 of the photo receptor 5 in the optical pickup 90, the embodiment according to the present invention.

The light receiving section 30 has at least two light receiving zones. The light receiving zones are arranged to receive the return beam Lb1, Lb2 or Lb3 between two caustics corresponding to the return beam Lb1, Lb2 or Lb3 applied with astigmatism by the hologram regions 22 and 25 shown in FIG. 5. The light receiving zones are divided by a split line in an almost same direction as a direction in which a beam (the return beam Lb1, Lb2 or Lb3) diffracted by the hologram regions 21 to 26 is further diffracted.

In the embodiment, the light receiving section 30 has four light receiving zones 31 to 34, as shown in FIG. 7, divided by a split line x30 and a split line y30 orthogonal to the split line x30. The light receiving zones 31 to 34 are arranged so that beam areas 45 and 42 (described later) are separated from each other by the split line x30 and also beam areas 55 and 52 (described later) are separated from each other by the split line x30.

In reproduction of the optical disc D1 (such as a DVD) in (a) of FIG. 4, as shown in (a) of FIG. 6, a beam spot Lb11 of a return beam Lb1 from the optical disc D1 is located in the center region of the hologram section 20. This is because the laser source 1 for disc-D1 use is located on the optical axis of the objective lens 200, as shown in (a) of FIG. 4.

The return beam Lb1 is diffracted when passing through each of the six hologram sections 21 to 26 of the hologram section 20. The diffracted return beam Lb1 then reaches the photoreceptor 30, as shown in (a) of FIG. 4.

Beam areas 41 to 46 on the photoreceptor 30, shown in (a) of FIG. 7, are particular regions on which the return beam Lb1 reaches after diffracted when passing through the hologram sections 21 to 26 in (a) of FIG. 6.

The beam areas 41 to 46, shown in (a) of FIG. 7, correspond to the hologram sections 21 to 26, shown in (a) of FIG. 6, respectively.

The locations of beam areas (where the return beam Lb1 or Lb2 reaches) on the light receiving section 30 depend on the positional accuracy of optical components in optical pickup assembly.

Broken lines in (a) of FIG. 7 indicate shifted beam areas 45 and 42, in reproduction of the optical disc D1 (such as a DVD), due to inaccurate locations of optical components in optical pickup assembly.

As shown in (a) of FIG. 7, the shifted beam areas 45 and 42 indicated by the broken lines have the same length of superposition with the split line x30 of the light receiving section 30 as that for the beam areas 45 and 42 (indicated by solid lines) with no shifting. In other words, there is no change in the length of superposition of the beam areas 45 and 42, and the split line x30 of the light receiving section 30, even if the beam areas 45 and 42 are shifted due to inaccurate optical pickup assembly.

Therefore, compared with the known optical pickup discussed with reference to (a) of FIG. 3, the photo receptor 5 in the optical pickup 90 of the present invention keeps high focus-error detection sensitivity, in reproduction of the optical disc D1, such as a DVD, irrespective of inaccurate locations of optical components caused in optical pickup assembly.

In reproduction of the optical disc D2 (such as a CD) in (b) of FIG. 4, as shown in (b) of FIG. 6, a beam spot Lb12 of a return beam Lb2 from the optical disc D2 is shifted from the center region of the hologram section 20. This is because the laser source 2 for disc-D2 use is located as being apart from the optical axis of the objective lens 200, as shown in (b) of FIG. 4.

When the beam spot Lb12 is shifted from the center region of the hologram section 20, a center OLb12 of the beam spot Lb12 is located in the hologram region 22 or 25, or on the border of the regions 22 and 25.

The return beam Lb2 is diffracted when passing through each of the six hologram sections 21 to 26 of the hologram section 20. The diffracted return beam Lb2 then reaches the photoreceptor 30, as shown in (b) of FIG. 4.

Beam areas 51 to 56 on the photoreceptor 30, shown in (b) of FIG. 7, are particular regions on which the return beam Lb2 reaches after diffracted when passing through the hologram sections 21 to 26 in (b) of FIG. 6.

The beam areas 51 to 56, shown in (b) of FIG. 7, correspond to the hologram sections 21 to 26, shown in (b) of FIG. 6, respectively.

As shown in (a) and (b) of FIG. 7, compared with reduction of the optical disc D1 (such as a DVD), reduction of the optical disc D2 (such as a CD) forms smaller beam areas 55 and 52 on the light receiving regions 31 and 32, respectively. Nevertheless, the beam areas 55 and 52 on the on the light receiving regions 31 and 32 are larger than the beam areas 155 and 152 on the light receiving regions 131 and 132 shown in (b) of FIG. 3 in the case of the known optical pickup.

The size of each of the beam areas 55 and 52 corresponds to the amount of light of the return beam Lb2 on the respective light receiving regions 31 and 32.

The larger size of the beam areas 55 and 52 in the optical pickup 90 of the present invention than the beam areas 155 and 152 in the known optical pickup 100 enhances light receiving sensitivity on the light receiving regions 31 and 32

Therefore, compared with the known optical pickup discussed with reference to (b) of FIG. 3, the photo receptor 5 in the optical pickup 90 of the present invention has higher focus-error detection sensitivity, in reproduction of the optical disc D2, such as a CD.

The locations of beam areas (where the return beam Lb1 or Lb2 reaches) on the light receiving section 30 depend on the positional accuracy of optical components in optical pickup assembly.

Broken lines in (b) of FIG. 7 indicate shifted beam areas 55 and 52, in reproduction of the optical disc D2 (such as a CD), due to inaccurate locations of optical components in optical pickup assembly.

As shown in (b) of FIG. 7, the size of the shifted beam areas 55 and 52 indicated by the broken lines is smaller than the beam areas 55 and 52 (indicated by solid lines) with no shifting, in the light receiving regions 31 and 32. Nevertheless, the change in the length of superposition of the shifted beam areas 55 and 52 and the split line x30 of the light receiving section 30 from that of the unshifted beam areas 55 and 52 and the split line x30 is smaller than the change in superposition length for the shifted beam areas 155 and 152 indicated by the broken lines in (b) of FIG. 3.

Therefore, for the same reason discussed above, the photo receptor 5 in the optical pickup 90 of the present invention keeps high focus-error detection sensitivity, in reproduction of the optical disc D2, such as a CD, irrespective of inaccurate locations of optical components caused in optical pickup assembly, compared to the known optical pickup 100.

The focus-error detection sensitivity affects the tolerance of optical discs to surface fluctuation. Thus, higher focus-error detection sensitivity serves to reduce degradation of recorded/reproduced signals, such as jitters and tracking errors.

Discussed next is reproduction of the optical disc D3 with the optical pickup 90 according to the present invention.

As shown in (c) of FIG. 4, of the optical disc D3, such as a dual-layered DVD, has two information recording layers d3a and d3b.

In reproduction of the information recording layer d3a of the optical disc D3, closer to the optical pickup 90, a beam spot Lb13 of a return beam Lb3 from the information recording layer d3a is located in the center region of the hologram section 20, as shown in (c) of FIG. 6.

During the reproduction of the information recording layer d3a of the optical disc D3, a return beam Lb4 from the information recording layer d3b not undergoing reproduction also reaches the hologram section 20. The return beam Lb4 is an unwanted beam but forms a beam spot Lb14, as indicated by a small solid-line circle in (c) of FIG. 6.

The diameters of the beam spots Lb13 and Lb14 are, for example, about 0.5 mm and 0.1 mm or less, respectively, on the hologram section 20.

The beam spot Lb14 of the unwanted return beam Lb4 is formed only on the two hologram regions 22 and 25 of the hologram section 20, as shown in (c) of FIG. 6. The unwanted return beam Lb4 is thus diffracted when passing through the hologram regions 22 and 25. Then, the diffracted beam Lb4 reaches the photoreceptor 30, as shown in (c) of FIG. 4.

Beam areas 62 and 65 on the photoreceptor 30, shown in (c) of FIG. 7, are particular regions on which the unwanted return beam Lb4 reaches after diffracted when passing through the hologram sections 22 and 25 in (c) of FIG. 6. The beam areas 62 and 65 correspond to the hologram sections 22 and 25, respectively.

The amount of defocus is generally obtained by calculating the difference between the sum of the amounts of light received on the light receiving regions 31 and 33 positioned at opposite angles, and the sum of the amounts of light received on the light receiving regions 32 and 34 positioned at opposite angles.

In the known optical pickup 100, the sum of the amount of light on the beam areas 161 to 166 is different among the light receiving zones 131 to 134, as discussed with reference to (c) of FIG. 3. It is therefore difficult for the known optical pickup 100 to obtain a correct amount of defocus, due to the unwanted return beam Lb104.

In contrast, as shown in (c) of FIG. 7, the beam areas 65 and 62 cover the light receiving regions 31 and 32, and 34 and 33, respectively, in the optical pick 90 according to the present invention.

Therefore, the amount of light received on the light receiving regions 31 and 33 positioned at opposite angles is the same as that on the light receiving regions 32 and 34 positioned at opposite angles, and hence the difference between the amounts is zero. The effects of the unwanted return beam Lb4 is then canceled out to obtain a correct amount of defocus.

Accordingly, compared to the known optical pickup 100, the optical pickup 90 according to the present invention can reduce degradation of reproduced signals due to out of focus.

Moreover, in the optical pickup 90, tracking (while the return beam Lb3 and the unwanted return beam Lb4 are reaching the hologram section 20) allows the beam spot Lb14 of the unwanted beam Lb4 being shifted only within the hologram regions 22 and 25, as indicated by a small broken-line arcs that surround the solid-line circle (that indicates the beam spot Lb14) in (c) of FIG. 6.

Therefore, the optical pickup 90 according to the present invention has no problem of out-of-focus, which is raised in the known optical pickup 100, as explained with reference to (c) of FIG. 2.

Described below are several modifications to the optical pickup 90, the embodiment according to the present invention.

[First Modification]

Figure 8:
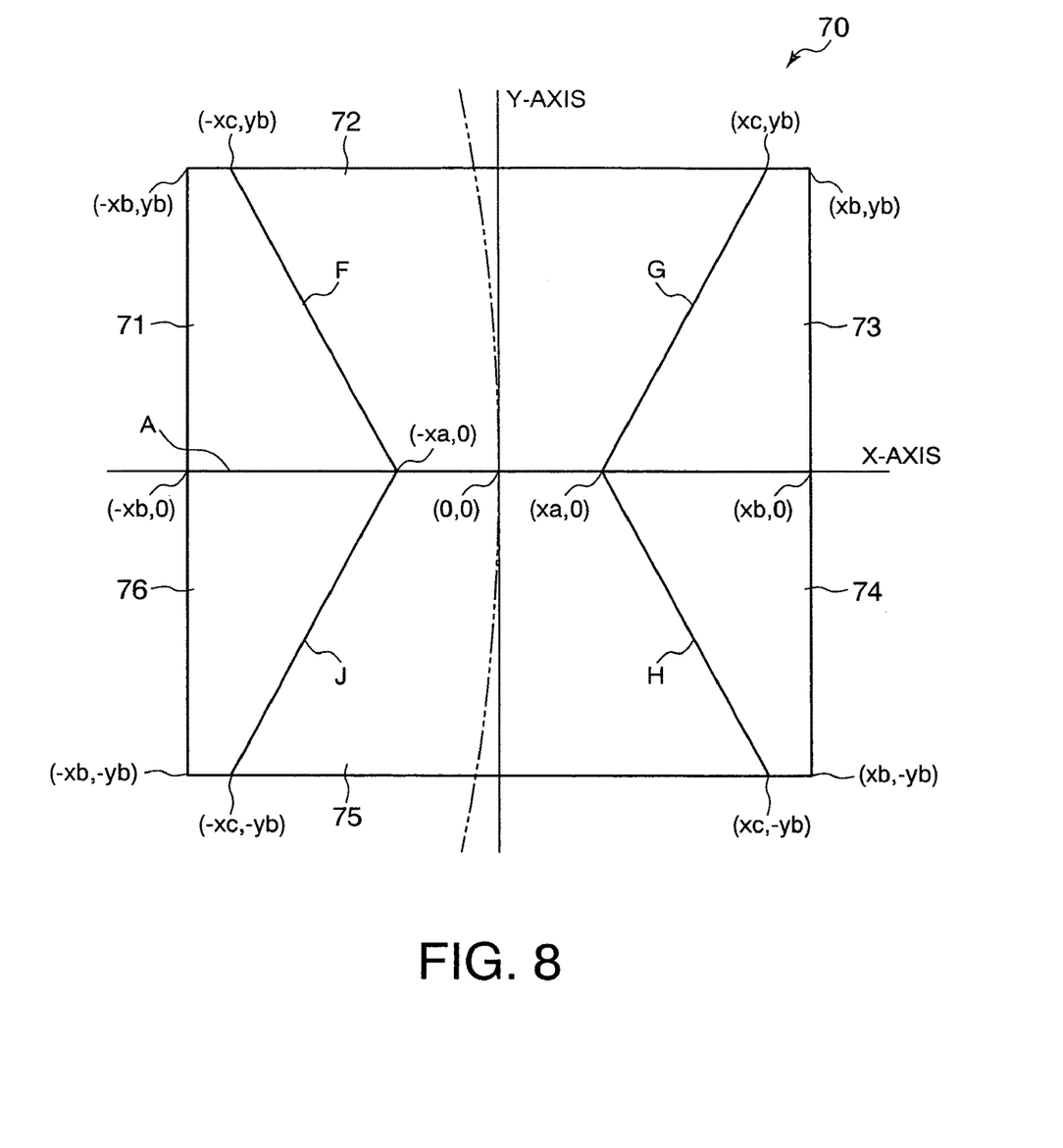
FIG. 8 is a plan view of a hologram section of a first modification to the optical pickup according to the present invention.

FIG. 8 is a plan view of a hologram section of a first modification to the optical pickup 90 according to the present invention.

A hologram section 70 of the first modification shown in FIG. 8 has six hologram regions with different shapes from those of the hologram section 20 shown in FIG. 5.

As illustrated in FIG. 8, the hologram section 70 has a plurality of regions surrounded by solid lines that connect four coordinate points (−xb, yb), (xb, yb), (xb, −yb), and (−xb, −yb) on the coordinate x-y.

Chain double dashed lines in FIG. 8 indicate a track of the optical disc D1, D2 or D3. The y-axis corresponds to a tangent of the track of the optical disc D1, D2 or D3 at a center coordinate point (0, 0).

The hologram section 70 has six hologram regions 71 to 76.

The hologram region 71 is divided from the other hologram regions by: a split line A (corresponding to the x-axis) that passes the center coordinate point (0, 0) and crosses the y-axis; and a split line F that connects coordinate points (−xa, 0) and (−xc, yb).

The hologram region 72 is divided from the other hologram regions by the split lines A and F, and also a split line G that connects coordinate points (xa, 0) and (xc, yb).

The hologram region 73 is divided from the other hologram regions by the split lines A and G.

The hologram region 74 is divided from the other hologram regions by the split line A and a split line H that connects the coordinate point (xa, 0) and a coordinate point (xc, −yb).

The hologram region 75 is divided from the other hologram regions by the split lines A and H, and also a split line 3 that connects the coordinate point (−xa, 0) and a coordinate point (−xc, −yb).

The hologram region 76 is divided from the other hologram regions by the split lines A and J.

In the coordinate points described above, xa, xb and xc, and −xa, −xb and −xc satisfy the relations xa<xc<xb and −xb<−xc<−xa, respectively.

Moreover, the following are defined in the first modification:

xa=0.15 mm, xb=0.5 mm, xc=0.3 mm, yb=0.5 mm,
−xa=−0.15 mm, −xb=−0.5 mm, −xc=−0.3 mm, and −yb=0.5 mm.

The hologram regions 72 and 75 are applied with astigmatism at an angle of about 45 degrees to the tangent (y-axis) of the track of the optical disc D1, D2 or D3 at the center coordinate points (0, 0). In contrast, the hologram regions 71, 72, 74, and 76 are applied with astigmatism at an angle of about 90 degrees to the tangent (y-axis) of the track of the optical disc D1, D2 or D3 at the center coordinate points (0, 0).

The hologram regions 71 to 76 diffract each of the return beams Lb1 to Lb3 from the optical discs D1, D2 and D3, respectively, in a direction that meets the tangent (y-axis) almost at right angles.

[Second Modification]

Figure 9:
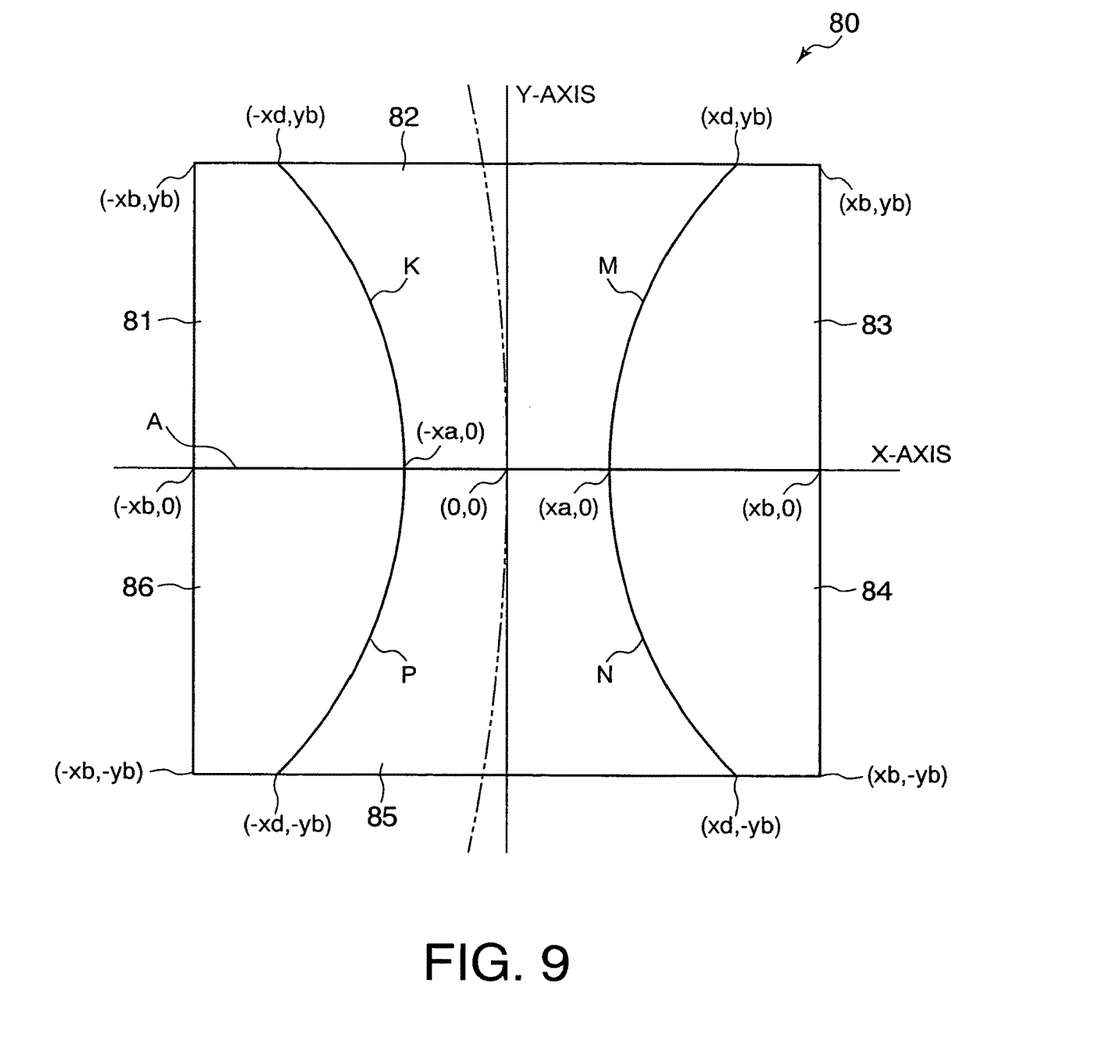
FIG. 9 is a plan view of a hologram section of a second modification to the optical pickup according to the present invention.

FIG. 9 is a plan view of a hologram section of a second modification to the optical pickup 90 according to the present invention.

A hologram section 80 of the second modification shown in FIG. 9 has six hologram regions with different shapes from those of the hologram section 20 shown in FIG. 5.

As illustrated in FIG. 9, the hologram section 80 has a plurality of regions surrounded by solid lines that connect four coordinate points (−xb, yb), (xb, yb), (xb, −yb), and (−xb, −yb) on the coordinate x-y. Chain double dashed lines in FIG. 9 indicate a track of the optical disc D1, D2 or D3. The y-axis corresponds to a tangent of the track of the optical disc D1, D2 or D3 at a center coordinate point (0, 0).

The hologram section 80 has six hologram regions 81 to 86.

The hologram region 81 is divided from the other hologram regions by: a split line A (corresponding to the x-axis) that passes the center coordinate point (0, 0) and crosses the y-axis; and a split line K that connects coordinate points (−xa, 0) and (−xd, yb).

The hologram region 82 is divided from the other hologram regions by the split lines A and K, and also a split line M that connects coordinate points (xa, 0) and (xd, yb).

The hologram region 83 is divided from the other hologram regions by the split lines A and M.

The hologram region 84 is divided from the other hologram regions by the split line A and a split line N that connects the coordinate point (xa, 0) and a coordinate point (xd, −yb).

The hologram region 85 is divided from the other hologram regions by the split lines A and N, and also a split line P that connects the coordinate point (−xa, 0) and a coordinate point (−xd, −yb).

The hologram region 86 is divided from the other hologram regions by the split lines A and P.

In the coordinate points described above, xa, xb and xd, and −xa, −xb, and −xd satisfy the relations xa<xd<xb and −xb<−xd<−xa, respectively.

Moreover, the following are defined in the first modification:
xa=0.15 mm, xb=0.5 mm, xd=0.3 mm, yb=0.5 mm, −xa=−0.15 mm, −xb=−0.5 mm, −xd=−0.3 mm, and −yb=0.5 mm.

The hologram regions 82 and 85 are applied with astigmatism at an angle of about 45 degrees to the tangent (y-axis) of the track of the optical disc D1, D2 or D3 at the center coordinate points (0, 0). In contrast, the hologram regions 81, 82, 84, and 86 are applied with astigmatism at an angle of about 90 degrees to the tangent (y-axis) of the track of the optical disc D1, D2 or D3 at the center coordinate points (0, 0).

The hologram regions 81 to 86 diffract each of the return beams Lb1 to Lb3 from the optical discs D1, D2 and D3, respectively, in a direction that meets the tangent (y-axis) almost at right angles.

In the hologram sections 20, 70 and 80 shown in FIGS. 5, 8 and 9, respectively, the split lines B to E, the split lines F to H and J, and the split lines K, M, N and P are folded lines, straight lines and curved lines, respectively, in addition to the straight split line A. However, the folded, straight and curved lines are combined (except for the straight split line A) to divide the hologram regions in the hologram section, according to the present invention.

As described above in detail, the present invention achieves constant recording/reproduction performance in optical pickups, with high focus sensitivity and few jitters to focus-error detection signals, irrespective of the positional accuracy of optical components in optical pickup assembly.

What is claimed is:

1. An optical pickup comprising:
a laser source for emitting a laser beam to an optical disc;
a hologram element provided on an optical axis of the laser beam and having a hologram section provided on a specific area of the hologram element, the hologram section diffracting a return beam reflected by the optical disc; and
a photo receptor for receiving the return beam diffracted by the hologram element,
wherein the specific area of the hologram element has an x-y plane having a center coordinate point (0, 0), an x-axis that is a first line passing the center coordinate point (0, 0), and a y-axis that is a second line passing the center coordinate point (0, 0) and crossing the first line, and
the specific area has a first hologram region, a second hologram region, a third hologram region, a fourth hologram region, a fifth hologram region, and a sixth hologram region on the x-y plane,
in which the first hologram region is divided from the second to sixth hologram regions by a first split line that is the first line and a second split line that connects coordinate points (−xa, 0) and (−xb, yb) on the x-y plane,
the second hologram region is divided from the first, third, fourth, fifth, and sixth hologram regions by the first and second split lines and a third split line that connects coordinate points (xa, 0) and (xb, yb) on the x-y plane,
the third hologram region is divided from the first, second, fourth, fifth, and sixth hologram regions by the first and third split lines on the x-y plane,
the fourth hologram region is divided from the first, second, third, fifth, and sixth hologram regions by the first split line and a fourth split line that connects the coordinate point (xa, 0) and a coordinate point (xb, yb) on the x-y plane,
the fifth hologram region is divided from the first, second, third, fourth, and sixth hologram regions by the first and fourth split lines and a fifth split line that connects the coordinate point (−xa, 0) and a coordinate point (−xb, −yb) on the x-y plane, and
the sixth hologram region is divided from the first, second, third, fourth, and fifth hologram regions by the first and fifth split lines on the x-y plane,
in which xa and xb, and −xa and −xb satisfy relations xa<xb and −xb<−xa, respectively, and
the second and fifth hologram regions are applied with astigmatism at a first specific angle to the second line and the first, third, fourth, and sixth hologram regions are applied with astigmatism at a second specific angle different from the first specific angle to the second line.

2. The optical pickup according to claim 1, wherein the second split line connects the coordinate points (−xa, 0) and (−xb, yb) via a coordinate point (−xa, ya) on the x-y plane in which ya and yb satisfies a relation ya<yb.

3. The optical pickup according to claim 1, wherein the third split line connects the coordinate points (xa, 0) and (xb, yb) via a coordinate point (xa, ya) on the x-y plane in which ya and yb satisfies a relation ya<yb.

4. The optical pickup according to claim 1, wherein the fourth split line connects the coordinate points (xa, 0) and (xb, −yb) via a coordinate point (xa, −ya) on the x-y plane in which −ya and −yb satisfies a relation −yb<−ya.

5. The optical pickup according to claim 1, wherein the fifth split line connects the coordinate points (−xa, 0) and (−xb, −yb) via a coordinate point (−xa, −ya) on the x-y plane in which −ya and −yb satisfies a relation −yb<−ya.

6. The optical pickup according to claim 1, each of the second to sixth split lines is a straight or a curved line.

* * * * *